United States Patent [19]

Bloch

[11] 4,287,653

[45] Sep. 8, 1981

[54] FORCE APPLYING APPARATUS

[76] Inventor: Howard Bloch, 1701 Nichols Canyon Rd., Los Angeles, Calif. 90046

[21] Appl. No.: 146,489

[22] Filed: May 5, 1980

[51] Int. Cl.³ .............................................. B23P 19/04

[52] U.S. Cl. ...................................................... 29/256

[58] Field of Search ................. 29/256, 258, 259, 263, 29/264, 233; 269/130, 131, 108; 228/47, 49 B

[56] References Cited

U.S. PATENT DOCUMENTS

| | | | |
|---|---|---|---|
| 1,587,689 | 6/1926 | Weiss et al. | 29/256 |
| 3,393,442 | 7/1968 | Brewer | 29/263 X |
| 3,711,920 | 1/1973 | Simmons | 29/256 |
| 3,944,202 | 3/1976 | Dearman | 269/130 |
| 4,027,373 | 6/1977 | Kwast et al. | 29/256 |
| 4,077,103 | 3/1978 | Kelley | 29/259 |

*Primary Examiner*—Robert C. Watson
*Attorney, Agent, or Firm*—Jack C. Munro

[57] ABSTRACT

A force applying device to remove a blower wheel from a shaft. The force applying apparatus takes the form of a plurality of bracket members which are tightly held against the exterior of the motor housing by means of a tightenable band. A threaded rod cooperates with each bracket member. Each threaded rod can be rotated with respect to its bracket member to be physically moved against the blower wheel which in turn is to result in separating of the blower wheel from the shaft.

2 Claims, 4 Drawing Figures

FORCE APPLYING APPARATUS

BACKGROUND OF THE INVENTION

The field of this invention relates to force applying apparatuses and more particularly to a force applying apparatus which is to quickly and efficiently remove a member which is attached onto a shaft and has become tightly secured to the shaft after a period of time.

Electric motors are very commonly used for rotating different types of members. Examples of such members would be a squirrel cage fan and a propeller type of fan blade. Such members are tightly mounted on the shaft and then secured in place by some type of fastening means, such as a threaded nut. It may be several months or years later when it is necessary to perform repair work on either the motor or the member and it becomes necessary to separate the member from the motor shaft. The threaded nut will be removed, but it is normally very difficult to remove the member because it has become welded by corrosion and dirt to the shaft.

The normal method for removing such a member is by merely hammering directly on the hub of the member until finally the member is separated from the shaft. However, such hammering inherently produces undesirable forces which are transmitted through the shaft and are imparted to bearings which support the shaft. As a result, these bearings usually become damaged and could be possibly damaged to the point where they need to be replaced. There is a need for a force applying apparatus which is to impart to the member an evenly distributed force along the longitudinal axis of the shaft which tends to separate the member from the shaft.

Such force applying apparatuses have been previously known and are frequently termed "wheel pullers". Previous "wheel pullers" normally connect directly to the rotatable member from the front side of the member and apply force to the end of the shaft. However, in some installations, it is almost impossible to obtain access to the end of the shaft. In such an installation, it would be most desirable to locate such a "wheel puller" on the opposite side of the member, such as on the housing of the motor. Previous to this invention, there was no known "wheel puller" that connected to the motor housing.

SUMMARY OF THE INVENTION

A force applying apparatus which is to be mounted in conjunction with a motor housing which is used to rotate a shaft upon which has been mounted a member to be rotated, the member to be rotated having a hub which is secured to the shaft. The force applying apparatus is to be mounted on the motor housing by means of an adjustable band. The adjustable band includes some form of tightening apparatus, such as a worm gear and slot arrangement. Such adjustable bands are well known and are what is frequently termed "hose clamps". A plurality of bracket members are mounted on the adjustable band and when the band is tightened, are pressed tightly against the motor housing. Each bracket member includes a threaded opening. A longitudinal threaded rod is to connect with each threaded opening. The inner end of each rod is to include an enlarged head adapted to engage with a torque applying tool, such as a wrench. The outer end of each rod includes an enlarged foot which is adapted to be located against the hub of the member. By turning each of the rods so that the foot section of each rod engages with the hub and exerts force against the hub, the member is to be ultimately disengaged from the shaft.

DETAILED DESCRIPTION OF THE SHOWN EMBODIMENT

Figure 1:
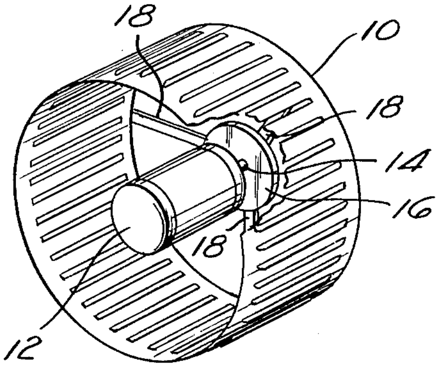
FIG. 1 is a partially cut-away isometric view of a squirrel cage type of fan assembly within which could be employed the force applying apparatus of this invention.

Referring particularly to the drawing, there is shown a rotatable member in the form of a squirrel cage blower 10 which has an internally centrally mounted electric motor mounted within a motor housing 12. The electric motor rotates a shaft 14. The member 10 includes a hub 16 which is fixedly mounted on one side of the member 10 by means of a plurality of bracket arms 18. The hub 16 includes a center hole into which is conducted the shaft 14. There is to be a snug fit between the shaft 14 and the hub 16.

Figure 2:
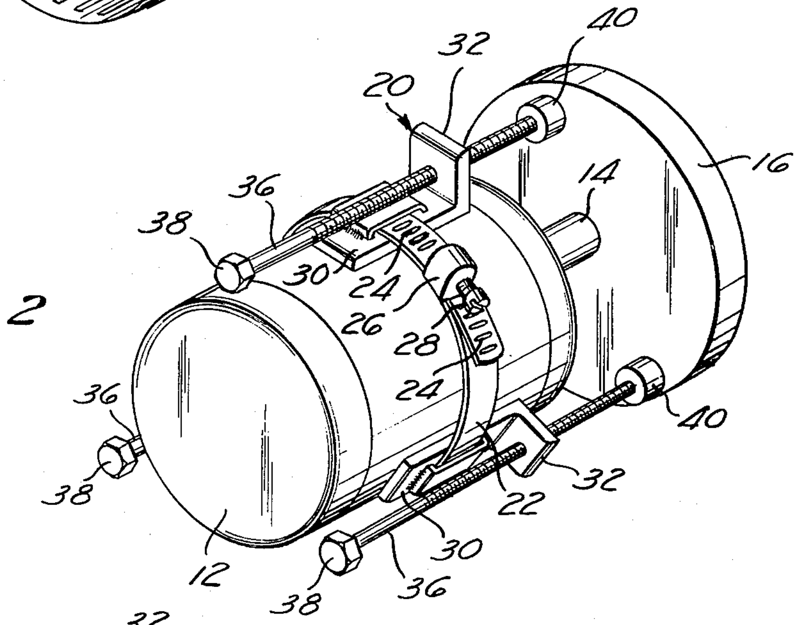
FIG. 2 is a view of motor housing and the hub section of the squirrel cage type of fan of FIG. 1 showing the force applying apparatus being connected thereto.
Figure 3:
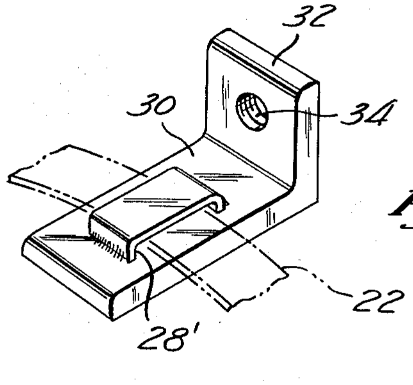
FIG. 3 is an enlarged isometric view of a single bracket member which is employed within the force applying apparatus of this invention.
Figure 4:
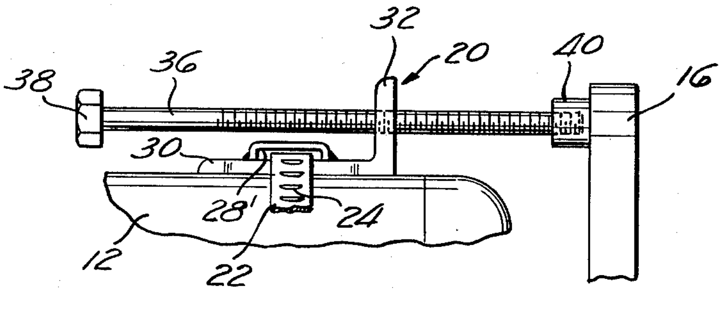
FIG. 4 is a side view of a single bracket member showing its mounting arrangement on the motor housing and the applying of the force to the hub of the member.

The force applying apparatus 20 of this invention is shown specifically within FIG. 2. Force applying apparatus 20 takes the form of a metallic band 22 which has a series of transverse slits 24 formed therein. Fixedly mounted on one end of the band 22 is a worm gear housing 26. Rotatably mounted within the housing 26 is a worm gear 28. The worm gear 28 is to be rotated by means of a conventional tool, such as a screw driver.

The worm gear 28 is to engage with the slits 24. Rotation of the worm gear 28 causes one end of the band 22 to move with respect to the other end of the band 22. This causes the band 22 to be tightened about the motor housing 12.

The band 22 is conducted through a notch 28' within a bracket member 30. There are three in number of the bracket members 30 mounted along the band 22. However, it is to be within the scope of this invention that more or less numbers of the bracket members 30 could be employed.

It is to be noted that each bracket member 30 is to be slidable to a desired longitudinal position with respect to the band 22 prior to tightening of the band 22 on to the motor housing 12. Also, the tightening of the band 22 causes the longitudinal portion of the bracket assembly 30 to be pushed against and tightly held to the motor housing 12.

Each bracket member 30 includes a right angle extension 32. Within each extension 32 is a threaded hole 34. Within each threaded hole 34 is threadably located a threaded rod 36. The inner end of the threaded rod 36 has an enlarged polygonal shaped head 38. This head 38 is to be adapted to be engaged by a tool, such as a wrench or a socket. The outer end of each rod 36 terminates in an enlarged foot pad 40. Each of the foot pads 40 are to be in contact with the hub 16.

It is to be made apparent that once the band 22 is tightened against the motor housing 12, that each of the rods 36 are to be turned until the foot pads 40 contact the hub 16. Thereafter, each of the rods 36 are turned slightly, such as one turn at a time, or one half turn at a time. This turning of each of the rods 36 is accomplished sequentially between the rods. This turning of the rods 36 occurs until the connection between the hub 16 and the shaft 14 is broken and the shaft 14 separates from the hub 16.

What is claimed is:

1. In combination with a motor housing, a shaft extending from said motor housing, said shaft to be rotated by a motor mounted within said motor housing, an air movement member mounted on said shaft to be rotated thereby, a tight fit established between said air movement member and said shaft, a force applying apparatus for removing said air movement member from said shaft, said force applying apparatus comprising:

securing means for attachment on said motor housing, said securing means including a flexible band assembly which is to be tightened onto said motor housing;

a bracket assembly connected to said securing means, said bracket assembly comprising a plurality of separate spaced-apart bracket members, said bracket members to be tightly held in position against said motor housing by said band, said bracket assembly being movable along said band when said band is not tightened upon said motor housing; and a force applying means connected by connecting means to said bracket members, said force applying means having an outer end and an inner end, said outer end of said force applying means to contact said air movement member, said inner end of said force applying means to engage with a torque applying tool, said connecting means permitting movement of said force applying means relative to said bracket members against said air movement member to cause said air movement member to be separated from said shaft.

2. The combination as defined in claim 1 wherein: said force applying means comprising a pluarlity of rods, there being a single said rod connected to a single said bracket member, said connecting means comprising a threaded connection between said rod and its respective said bracket member.

* * * * *